(12) United States Patent
Chu et al.

(10) Patent No.: US 8,887,253 B2
(45) Date of Patent: Nov. 11, 2014

(54) METHOD OF ASSIGNING A USER KEY IN A CONVERGENCE NETWORK

(75) Inventors: Younsung Chu, Anyang-si (KR); Jihye Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/819,670

(22) PCT Filed: Sep. 28, 2011

(86) PCT No.: PCT/KR2011/007159
§ 371 (c)(1),
(2), (4) Date: Feb. 27, 2013

(87) PCT Pub. No.: WO2012/044072
PCT Pub. Date: Apr. 5, 2012

(65) Prior Publication Data
US 2013/0167210 A1    Jun. 27, 2013

Related U.S. Application Data (60) Provisional application No. 61/387,462, filed on Sep. 28, 2010, provisional application No. 61/390,197, filed on Oct. 6, 2010, provisional application No. 61/406,163, filed on Oct. 24, 2010.

(51) Int. Cl.

| | |
|---|---|
| *H04L 29/06* | (2006.01) |
| *H04L 9/08* | (2006.01) |
| *H04W 12/06* | (2009.01) |
| *H04W 12/04* | (2009.01) |
| *G06F 21/45* | (2013.01) |
| *H04L 9/32* | (2006.01) |
| *H04W 92/02* | (2009.01) |
| *H04W 60/00* | (2009.01) |

(52) U.S. Cl.
CPC ............... *H04L 9/083* (2013.01); *H04W 12/06* (2013.01); *H04W 12/04* (2013.01); *H04W 92/02* (2013.01); *G06F 21/45* (2013.01); *H04L 9/3271* (2013.01); *H04W 60/00* (2013.01)
USPC ............ 726/6; 726/7; 726/9; 726/12; 726/14; 726/18

(58) Field of Classification Search
None
See application file for complete search history.

(56) References Cited

U.S. PATENT DOCUMENTS

| | | | |
|---|---|---|---|
| 2007/0209065 A1* | 9/2007 | Branam et al. | ..................... 726/5 |
| 2011/0207403 A1 | 8/2011 | Kim et al. | |
| 2011/0212689 A1 | 9/2011 | Kim et al. | |

FOREIGN PATENT DOCUMENTS

| | | | |
|---|---|---|---|
| KR | 10-2010-0054187 A | 5/2010 | |
| KR | 10-2010-0054195 A | 5/2010 | |

OTHER PUBLICATIONS

OMA, "Converged Personal Network Service Requirements", Candidate Version 1.0, Open Mobile Alliance Ltd., OMA-RD-CPNS-V1_0-20091117, pp. 1-36, Nov. 17, 2009.

*Primary Examiner* — Hadi Armouche
*Assistant Examiner* — Andrew Steinle
(74) *Attorney, Agent, or Firm* — Birch, Stewart, Kolasch & Birch, LLP (57) ABSTRACT

Discussed is a method of operating a CPNS (converged personal network service) gateway apparatus. The method includes transmitting a registration request message including user information to a server; transmitting an installation request message including the user information to a terminal; generating first authentication data on the basis of authentication information received by a user input; transmitting a trigger message including the first authentication data to the terminal; receiving a key assignment request message including second authentication data from the terminal in response to the trigger message; transmitting the received key assignment request message to the server; receiving a key assignment response message including a user key for the terminal in response to the key assignment request message; and transmitting the received key assignment response message to the terminal.

12 Claims, 7 Drawing Sheets

METHOD OF ASSIGNING A USER KEY IN A CONVERGENCE NETWORK

This application is the National Phase of PCT/KR2011/007159 filed on Sep. 28, 2011, which claims priority under 35 U.S.C. 119(e) to the U.S. Provisional Application Nos. 61/387,462 filed on Sep. 28, 2010, 61/390,197 filed on Oct. 6, 2010 and 61/406,163 filed on Oct. 24, 2010, all which are hereby expressly incorporated by reference into the present application.

BACKGROUND OF THE INVENTION

1. Field of the Invention

The present invention relates to a converged personal network service (CPNS) framework. More particularly, the present invention relates to assignment of a user key for the CPNS.

2. Related Art

Among various developed techniques, the conventional technique such as digital living alliance network (DLNA), ZigBee®, etc., focuses on the search and use of a service of a device in a specific personal area network (PAN), and a tethering technique focuses on a connection between heterogeneous networks.

On the other hand, unlike the simple PAN, the concept of a converged personal network service (CPNS) is introduced.

The CPNS allows devices belonging to a personal network (PN) (also referred to as a personal area network (PAN)) to receive several services.

The CPNS is implemented by using a CPNS server, a CPNS gateway, and a device supporting the CPNS. In addition thereto, a general server and general devices may also be present.

The CPNS is based on the PN. The PN is an aggregation of devices. The CPNS gateway is placed within the PN. Through the CPNS gateway, a service of the devices belonging to the PN is registered to the CPNS server. Thereafter, a device which provides a specific service can be searched from the CPNS server. On the basis of this search, an external entity can share the service provided from the device.

The CPNS gateway (also referred to a PN gateway (GW)) takes a role of connecting the PN to another network. The CPNS device is also referred to as a personal network entity (PNE), and is a constitutional element of the PN. One PNE may be an aggregation of several devices, or may be a single device.

Figure 1:
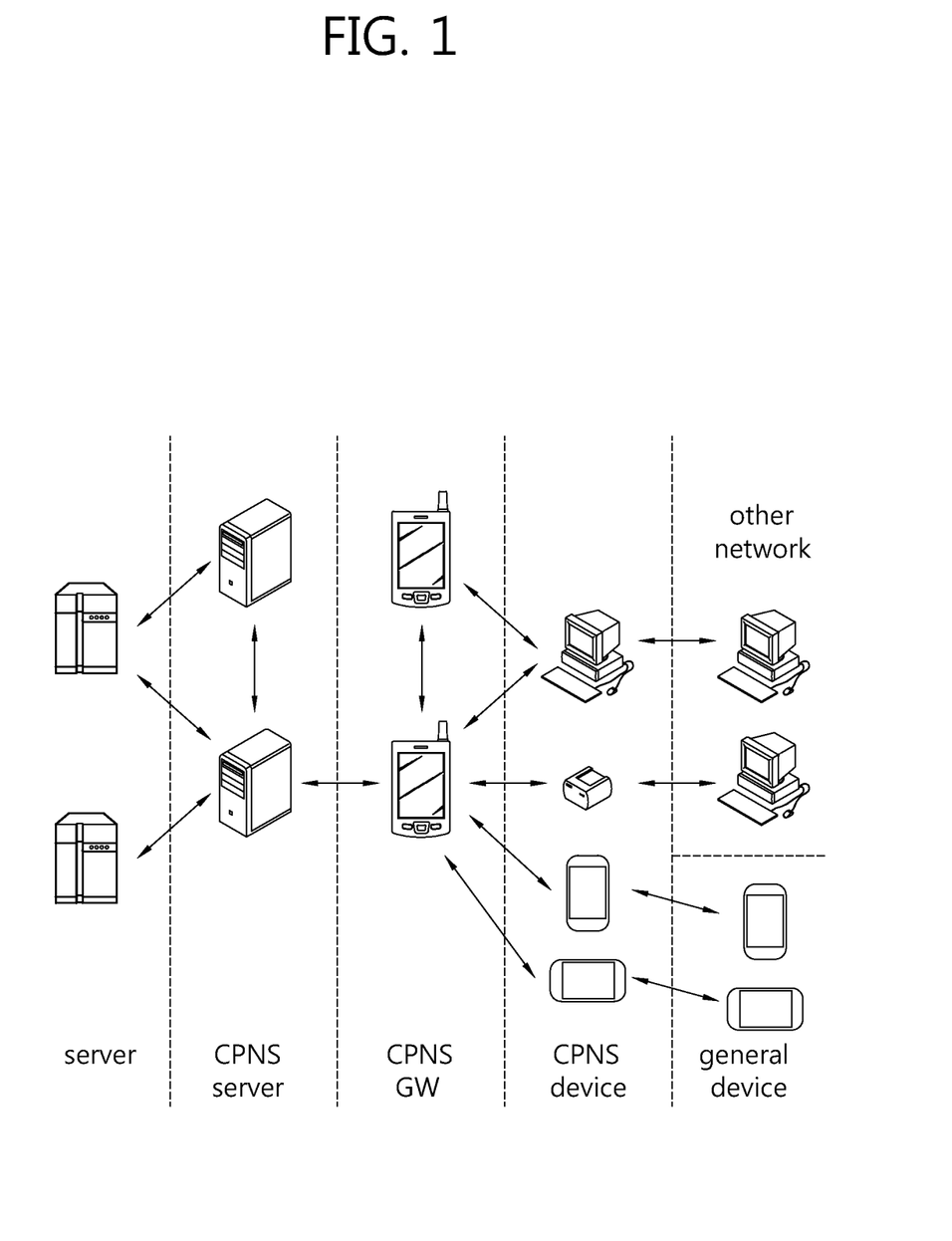
FIG. 1 is an exemplary diagram showing the concept of a CPNS.

FIG. 1 is an exemplary diagram showing the concept of a CPNS.

Referring to FIG. 1, there are a general server, a CPNS server, a CPNS gateway, a CPNS device, and a general device.

The CPNS server can communicate with one or more CPNS gateways (i.e., PN gateways), and can transmit and receive data. Each CPNS server can exchange data by communicating with one or more CPNS devices in a PN (or a personal area network (PAN)) through the CPNS gateway.

Each of the CPNS devices can transmit and receive data with respect to one or more other CPNS devices or general devices through the CPNS gateway.

The CPNS gateway can transmit and receive data by communicating with the CPNS server, or a CPNS gateway belonging to another PN, or a CPNS device.

Each CPNS server can transmit and receive data by communicating with the general server and the CPNS gateway.

For example, the CPNS server and the CPNS gateway can communicate with each other by using a cellular network, and the CPNS gateway and the CPNS device can communicate with each other by using near field communication, e.g., BLUETOOTH™, NFC, ZigBee®, Wi-Fi, etc.

Meanwhile, the CPNS server manages and controls communication between the CPNS gateway and the CPNS device. As a result, applications and information are exchanged, thereby being able to increase a user experience. For example, in FIG. 1, a user acquires location information from another CPNS device (e.g., GPS) by using any CPNS device, transmits the location information to the CPNS server through the CPNS gateway, and receives a location-based service from the CPNS server.

Accordingly, the user can receive various services via several CPNS devices belonging to the PN.

SUMMARY OF THE INVENTION

The aforementioned conventional technique provides only the concept of a converged personal network service (CPNS), and does not provide necessary technical features required to actually implement such a CPNS service. Therefore, the present invention provides a detailed technique for implementing the CPNS service.

The present invention provides a CPNS service subscription process using an authenticated CPNS gateway and a process of assigning a user key to a CPNS device on the basis of user identification information used in the subscription process.

In an aspect, a method of operating a converged personal network service (CPNS) gateway apparatus for assigning a CPNS user key to a terminal is provided. The method includes transmitting a registration request message including user information to a server, transmitting an installation request message including the user information to the terminal, generating first authentication data on the basis of authentication information received by a user input, transmitting a trigger message including the first authentication data to the terminal, receiving a key assignment request message including second authentication data from the terminal in response to the trigger message, transmitting the received key assignment request message to the server, receiving a key assignment response message including a user key for the terminal from the server in response to the key assignment request message, and transmitting the received key assignment response message to the terminal. The key assignment request message is received according to an evaluation result of the first authentication data using the user information in the terminal, and the second authentication data is generated on the basis of the user information. The key assignment response message is received according to an evaluation result of the second authentication data using the user information in the server.

The aforementioned embodiment or other embodiments can include one or more of the following features.

The generated first authentication data may be for confirming whether the trigger message is transmitted by a user of the terminal. Further, the first authentication data may be for examining whether the authentication information received by the user input is matched to the user information. Further, the terminal may do not have a user interface (UI) function capable of receiving an input from the user to request the assignment of the user key. Further, the first authentication data may be for performing processes of requesting the assignment of the user key for the terminal not having the UI function. Further, the user information and the authentication information may include a user identifier (ID) and a user password. Further, the second authentication data may be for confirming whether the key assignment request message is transmitted by a user of the terminal. Further, the second authentication data may be for examining whether the user information installed to the terminal is matched to the user information registered to the server. Further, the terminal and the CPNS gateway apparatus may be mutually authenticated from each other. Further, the CPNS gateway apparatus and the server may be mutually authenticated from each other.

In another aspect, a method of operating a converged personal network service (CPNS) terminal which requests the assignment of a CPNS user key is provided. The method includes receiving an installation request message including user information from a gateway apparatus, installing the user information, transmitting an installation response message to the gateway apparatus in response to the installation request message, receiving a trigger message including first authentication data from the gateway apparatus, evaluating whether the trigger message is transmitted by a user of the CPNS terminal on the basis of the installed user information and the first authentication data, if the evaluation result shows that the trigger message is transmitted by the user of the CPNS terminal, transmitting a key assignment request message including second authentication data to the gateway apparatus so that the CPNS server can assign a user key, and receiving a key assignment response message including the assigned user key.

In another aspect, a communication apparatus is provided. The communication apparatus includes a storage unit for storing a converged personal network service (CPNS) enabled entity configured to a personal network gateway (PNE) mode, a transceiver for transmitting an installation request message including user information to a terminal having a CPNS enabled entity configured to a PNE mode, for receiving an installation response message from the terminal in response to the installation request message, for transmitting a trigger message including first authentication data to the terminal, receive a key assignment request message generated on the basis of the first authentication data from the terminal, for relaying the received key assignment request message to a server, for receiving a key assignment response message including a user key for the terminal from the server in response to the key assignment request message, and for relaying the received key assignment response message to the terminal, and a controller for generating the first authentication data on the basis of authentication information received by a user input so that the terminal can request the assignment of the user key.

According to embodiments of converged personal network service (CPNS) entity user key (EUKey) assignment, the aforementioned problems of the conventional technique can be solved. That is, the present invention proposes a detailed technique for implementing user key assignment for a CPNS.

A CPNS device conforming to the user key assignment process described in the present invention can receive a CPNS user key issued from a CPNS server. In particular, even if a CPNS device does not have a user interface function, a user key can be assigned to the CPNS device from the CPNS server via a CPNS gateway.

The CPNS device conforming to the user key assignment process described in the present invention can receive a service provided by the CPNS server by installing a plurality of user keys in one device.

DESCRIPTION OF EXEMPLARY EMBODIMENTS

The present invention relates to a converged personal network service (CPNS) framework. However, the present invention is not limited thereto, and thus can also be applied to all communication systems and methods to which the technical features of the present invention can be applied, as well as other systems.

In addition, the terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein are erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms are intended to include the plural forms as well, unless the context clearly indicates otherwise. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

It will be understood that although the terms "first" and "second" are used herein to describe various elements, these elements should not be limited by these terms. These terms are only used to distinguish one element from another element. For example, a first component may be termed a second component, and similarly, the second component may be termed the first component without departing from the scope of the present invention.

When a component is mentioned as being "connected" to or "accessing" another component, this may mean that it is directly connected to or accessing the other component, but it is to be understood that there are no intervening components present. On the other hand, when a component is mentioned as being "directly connected" to or "directly accessing" another component, it is to be understood that there are no intervening components present.

Hereinafter, exemplary embodiments of the present invention will be described with reference to the accompanying drawings. It is to be noted that like reference numerals denote the same components in the drawings, and a detailed description of a known structure or function of the present invention will be omitted herein if it is deemed to obscure the subject matter of the present invention. In the following description, well-known functions or constructions are not described in detail since they would obscure the invention in unnecessary detail. The exemplary embodiments should be considered in descriptive sense only and not for purposes of limitation, and do not intend to limit technical scopes of the present invention. However, it is to be understood that the invention is not limited to the disclosed embodiments, but, on the contrary, is intended to cover various modifications and equivalent arrangements included within the spirit and scope of the appended claims.

A terminal shown in the accompanying drawings can also be referred to as a user equipment (UE), a mobile equipment (ME), a mobile station (MS), a user terminal (UT), a subscriber station (SS), a wireless device, a handheld device, and an access terminal (AT). In addition, the terminal may be a portable device having a communication function such as a mobile phone, a smart phone, a wireless modem, a laptop, etc., or may be a non-portable device such as a personal computer (PC), an in-vehicle device, etc.

Hereinafter, terms to be used in the present invention will be summarized in brief to facilitate understanding of the invention.

1) Converged personal network service (CPNS) framework: The CPNS allows devices belonging to a personal network (PN) (or personal area network (PAN)) to receive several services. When comparing the CPNS with a general tethering service, the tethering service is a technique in which a device simply connected to the Internet assigns a private Internet protocol (IP) address to a different device by using a NAT technique, and thus allows the different device to be connected to the Internet by using the private IP. On the other hand, instead of being limited to a case where a first device of a user simply assigns a private IP address to another device, the CPNS allows the first device to manage several services that can be provided through a mobile communication network. As such, since the several services are collectively managed by the first device of the user, a service can be seamlessly shared among the several devices of the user. For example, while a video on demand (VOD) is used by the first device of the user, it can be seamlessly delivered to a second device. Therefore, user convenience can be improved. In addition, when the user owns several devices, if an external server intends to deliver service data to the user even if there is no request of the user, it shall be determined to which device the data will be delivered among the several devices. For example, when the user has several devices capable of video telephony, if the user receives a video telephony request, it shall be determined to which device the video telephony call is delivered among the several devices. In addition, the video telephony currently in use shall be seamlessly delivered to another device of the user. Such a CPNS is achieved by a CPNS enabled entity included in the device of the user.

2) CPNS enabled entity: The CPNS enabled entity is a logical entity object, and may be classified into three types. That is, a PNE, a PN GW, and a CPNS server may exist. The CPNS server entity is located in a core network, and the PNE and the PN GW are located in a CPNS device.

3) CPNS device: It is a device that can operate in several modes simultaneously in a personal network. The CPNS device has a function for processing, storing, and reproducing contents. Further, the CPNS device may have a communication interface which allows different CPNS devices to operate in different modes in the personal network.

4) CPNS server: It is a functional entity capable of providing resources to CPNS entities either in response to a request or in a push manner. A device and user related service is registered to the CPNS server. The CPNS server stores corresponding information, and provides a registration of a PN which is an aggregation of devices and a registration of a service group embracing from the PN to a WAN. In addition, the CPNS server can communicate with external entities such as a contents providing server. The CPNS server is an entity for configuring a key used to authenticate a device owned by a user, in order to perform a service on a CPNS frame. In addition, the CPNS server receives registration of an externally provided service, and supports a request of searching and consuming/providing so that the device can consume the service.

5) Personal network (PN): It is an aggregation of devices capable of consuming or generating a service by a user. All devices in the PN can be connected to a PN GW. The PN may change over time. The PN may include a device operating at least in a GW mode and other devices operating in a PNE mode.

6) PNE: It is an abbreviation of a personal network element, and is a constitutional element of the PN. The PNE may consume or provide a service or contents. The PNE is an entity for actually consuming contents, applications, and services. The PNE is an entity used as a component when generating a PN and a service group.

7) PN GW: It is an abbreviation of a personal network gateway. The PN GW is an entity which exists in a PN and a wide area network, and can generate a PN for providing a CPNS service. In addition, the PN GW takes a role of connecting heterogeneous networks for a device which exists in the PN but cannot be connected to an external element, and provides registration of a CPNS server and inventory management with respect to connected devices.

The PN GW in a device allows not only a PNE existing in the PN but also other devices to be connected to the CPNS server. The PN GW existing in the device uses a global network such as a mobile network. In addition, the PN GW manages a service with respect to PNEs and also manages information on communication and extra other functions.

8) PN inventory: It is a list of devices and PNs belonging to a PN or several PNs.

9) Service group: It is a group of PN GWs and PNEs which share services, data, and applications. It implies an aggregation of devices registered to a server via a generated PN. In this case, all devices which are constitutional elements of the service group do not have to belong to one PN. The devices include all devices which cannot be connected to each other since they belong to several PNs and thus are separated in location from each other.

10) Zone: a specific area zone.

11) Zone based service: It implies a zone-based CPNS service provided in the coverage of a PN GW.

12) Zone PN GW: It is a PN GW which provides contents or a unique service in a zone.

13) Mode of CPNS enabled entity: A CPNS device can operate in a PN GW mode and a PNE mode. The mode can be confirmed between devices by using a CPNS entity discovery function. A PN must include at least a device operating in the PN GW mode and a PNE operating in the PNE mode. The PNE and the PN GW must know mutual modes to generate or participate in a PN. The PN GW must be able to identify the PNE to create a member of the PN. In addition, the PNE must know the PN GW to newly generate the PN or to participate in the previously generated PN.

If there is a device (e.g., an MP3 player and a smart meter) which supports only the PNE mode, the device operates only in the PNE mode. If a certain device can operate only in the PN GW mode, the device operates in the PN GW mode. However, if a certain device can operate in any one of the PN GW mode and the PNE mode, the device can operate in any one of the aforementioned modes according to a pre-stored configuration value, and the mode can change depending on a configuration of a user or a configuration of a vendor.

Figure 2:
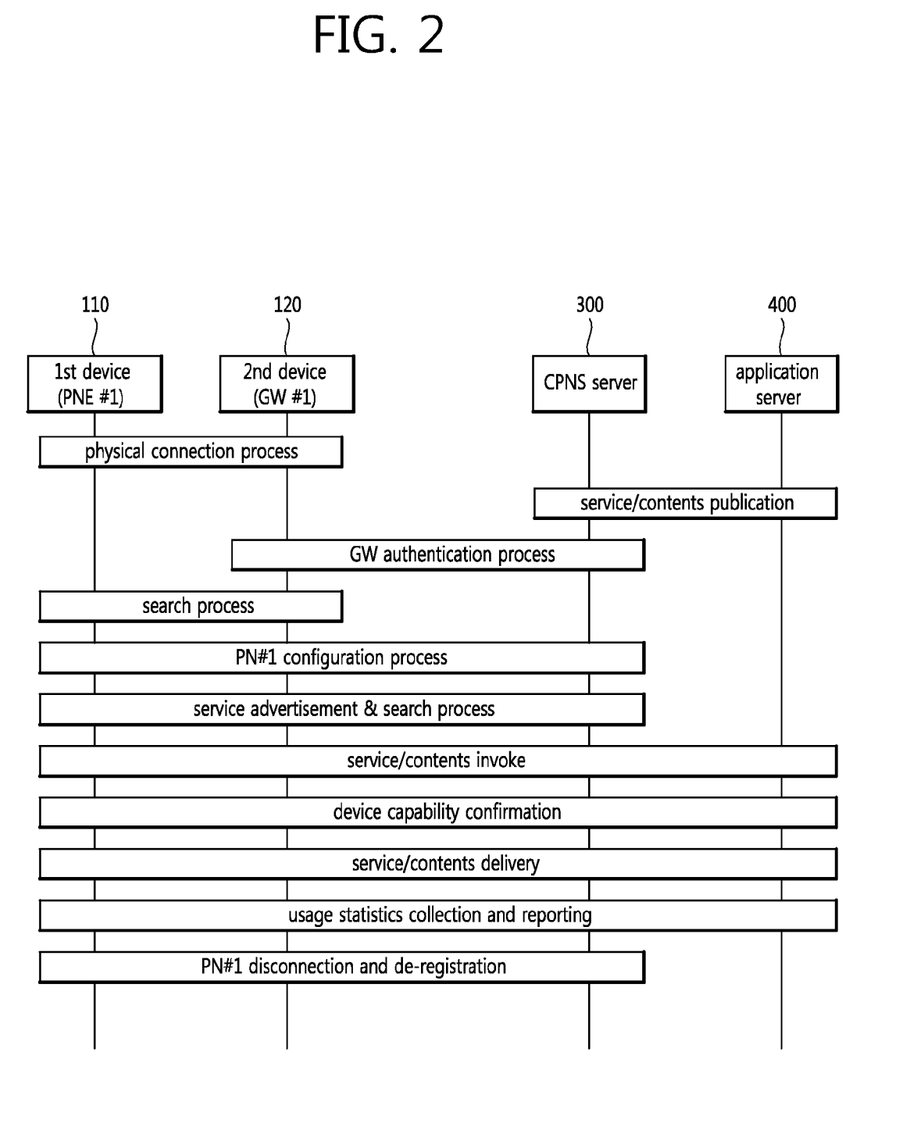
FIG. 2 shows an example of a whole procedure of a CPNS according to an embodiment of the present invention.

FIG. 2 shows an example of a whole procedure of a CPNS according to an embodiment of the present invention.

Referring to FIG. 2, there are a $1^{st}$ device 110, a $2^{nd}$ device 120, a CPNS server 300, and an application server 400.

The $1^{st}$ and $2^{nd}$ devices 110 and 120 are devices owned by a user A. The $1^{st}$ device 110 is a cellular phone of the user A, and may include a $1^{st}$ transceiver so as to be connected to the CPNS server 300 via a mobile communication network. In addition, the $1^{st}$ device 110 may include a $2^{nd}$ transceiver, for example, BLUETOOTH™, WiFi, and ZigBee®, capable of configuring a personal network. The $2^{nd}$ device 120 is a portable multimedia of the user A. The $2^{nd}$ device 120 may not have the $1^{st}$ transceiver capable of communicating with the mobile communication network, but may include only the $2^{nd}$ transceiver, for example, BLUETOOTH™, WiFi, and ZigBee®, capable of configuring the personal network.

The $1^{st}$ and $2^{nd}$ devices 110 and 120 may have CPNS enabled entities. Each CPNS enabled entity can operate in a gateway mode or a PNE mode. For example, it is shown in FIG. 2 that the $2^{nd}$ device 120 operates in the gateway mode since the $2^{nd}$ device 120 has the $1^{st}$ transceiver that can be connected through the mobile communication network.

The $1^{st}$ device 110 and the $2^{nd}$ device 120 perform a physical connection process via the $2^{nd}$ transceiver when the $1^{st}$ and $2^{nd}$ devices 110 and 120 are located in a near distance to each other. Meanwhile, the application server 400 registers or advertises a service and contents to the CPNS server 300. In addition, the CPNS server 300 performs a process of authenticating the $2^{nd}$ device 120 operating in the gateway mode.

Meanwhile, when the $1^{st}$ device 110 and the $2^{nd}$ device 120 finish the physical connection process, respective CPNS enabled entities perform a search process with each other.

If the search is finished, the devices configure a PN#1. In this case, information on the PN#1 is registered to the CPNS server 300. In addition, after the search is finished, the devices are registered to the CPNS server 300 by using user information, receive an assigned user key from the CPNS server, and thereafter perform the subsequent process. A procedure in which a user key is assigned to the PN#1 through a configuration process will be described below.

When the configuration of the PN#1 is finished, the CPNS server 300 advertises its own service to devices in the PN#1, or searches for a service that can be provided by the devices in the PN#1.

When any device in the PN#1 invokes any service or contents among the advertised services, a process for confirming capability of the any device is performed, and a service or contents are delivered according to the confirmed capability.

When the any device uses the service or the contents, a usage statistics thereof is collected, and is reported to the CPNS server 300 or the application server 400.

If the PN#1 is no longer necessary, the PN#1 is disconnected, and information on the PN#1 can be de-registered from the CPNS server 300.

Figure 3:
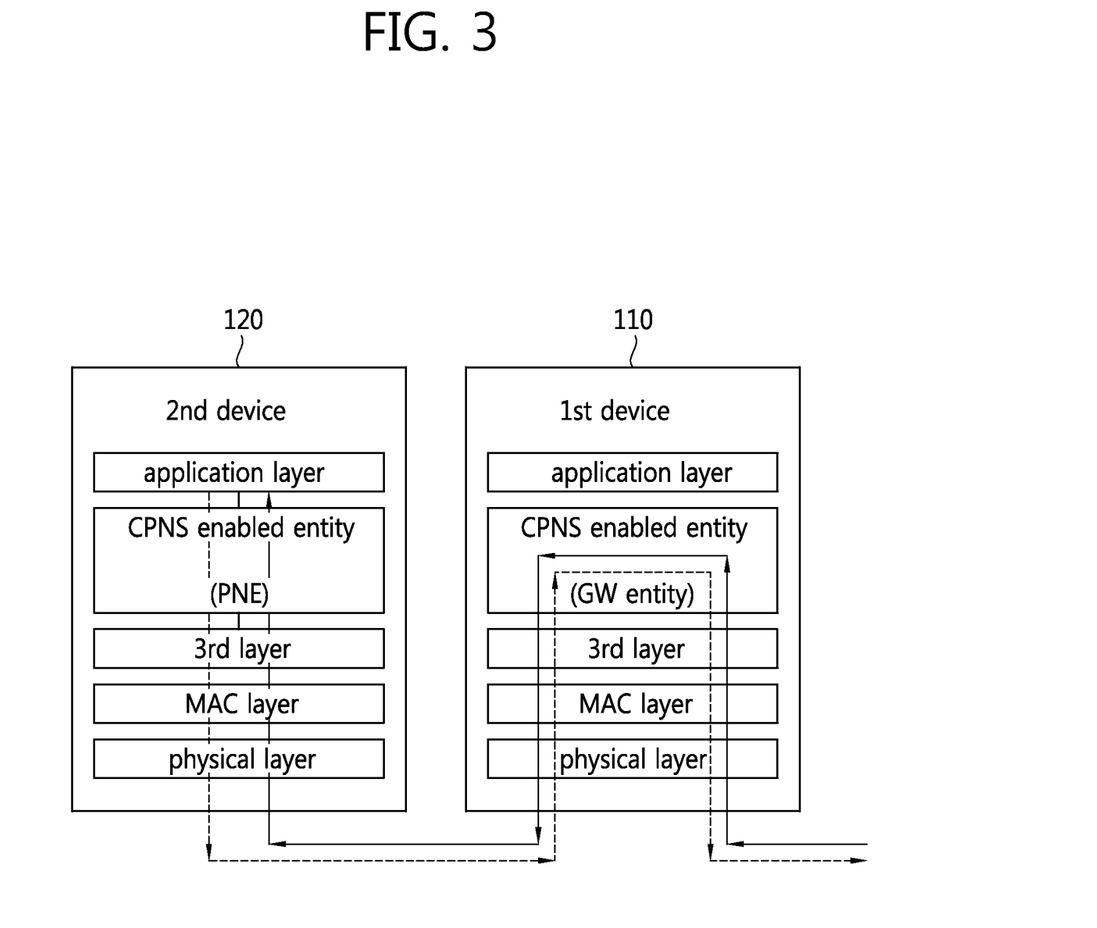
FIG. 3 shows architectures of $1^{st}$ and $2^{nd}$ devices of FIG. 2.

FIG. 3 shows architectures of $1^{st}$ and $2^{nd}$ devices of FIG. 2.

Referring to FIG. 3, $1^{st}$ and $2^{nd}$ devices 110 and 120 have a physical layer, a MAC layer, a $3^{rd}$ layer, a CPNS enabled entity, and an application layer. In this case, the CPNS enabled entity of the $2^{nd}$ device 120 is driven in a PNE mode, and the CPNS enabled entity of the $1^{st}$ device 110 drives only a gateway entity. On the other hand, the CPNS enabled entity of the $1^{st}$ device 110 drives the gateway entity.

Therefore, as indicated by a solid line in FIG. 3, service data is delivered to a gateway entity in the CPNS enabled entity via the physical layer, MAC layer, and $3^{rd}$ layer of the $1^{st}$ device 110. If the gateway entity of the $1^{st}$ device 110 receives the service data, the service data is delivered to the $2^{nd}$ device 120 via the $3^{rd}$ layer, MAC layer, and physical layer of the CPNS enabled entity.

In the $2^{nd}$ device 120, a PNE of the CPNS enabled entity receives data via the physical layer, the MAC layer, and the $3^{rd}$ layer.

Meanwhile, the PNE in the CPNS enabled entity of the $2^{nd}$ device 120 transmits a control message such as a request message or a response message to the $1^{st}$ device 110 via the $3^{rd}$ layer, the MAC layer, and the physical layer.

Hereinafter, a method of assigning a user key to a device operating in a PNE mode will be described according to an embodiment of the present invention.

Figure 4:
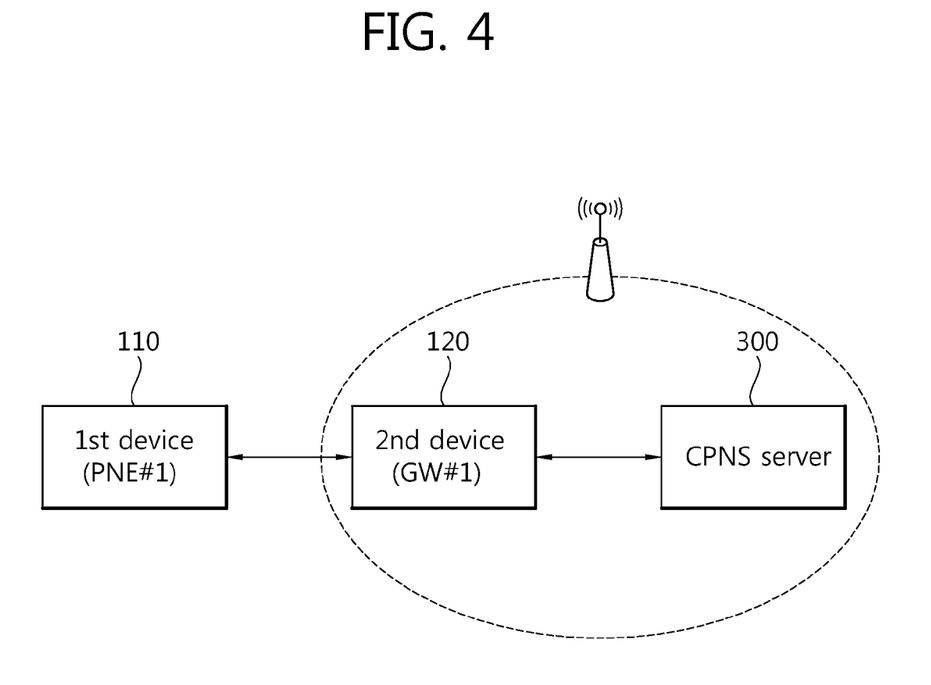
FIG. 4 shows an overview of a user key assignment method according to an embodiment of the present invention.

FIG. 4 shows an overview of a user key assignment method according to an embodiment of the present invention.

Referring to FIG. 4, $1^{st}$ and $2^{nd}$ devices 110 and 120 belonging to one PN can operate respectively as a PNE and a PN gateway. Therefore, the $1^{st}$ and $2^{nd}$ devices 110 and 120 can be configured with one wireless PAN, and can be physically connected with Wi-Fi, BLUETOOTH™, ZigBee®, etc. In addition, the $2^{nd}$ device 120 operating as the PN gateway can transmit and receive data with respect to the CPNS server 300 by being connected to a mobile communication network (e.g., a cellular network).

Since the PNE existing in the PN cannot be directly connected to a cellular network similarly to the $1^{st}$ device 110, a service provided on the cellular network cannot be directly provided similarly to the CPNS server 300. Therefore, the $1^{st}$ device 110 configures a CPNS PN through a physical connection with the $2^{nd}$ device 120, and performs authentication with the CPNS server 300 via the $2^{nd}$ device 120 corresponding to a PN gateway. Thereafter, the $1^{st}$ device 110 receives a user key assigned by the CPNS server 300.

A CPNS entity user key (EUKey) introduced in the present invention is assigned after the $1^{st}$ device 110 corresponding to the PNE performs user authentication with respect to the CPNS server 300 via the $2^{nd}$ device 120 corresponding to the PN gateway. For this, user information is registered to the CPNS server 300 on the basis of a user ID (i.e., User-ID) and a user password (i.e., User-Pwd), and is installed to the $1^{st}$ device 110.

Specifically, the user performs a subscription/registration process with respect to the CPNS server 300 by using the user ID and the user password, and installs user information to the $1^{st}$ device 110 by using the user ID and the user password. The installed user information can be used for user authentication and user key assignment with respect to the CPNS server 300.

As such, in order for the user to use contents or the like provided from the CPNS server 300 to the $1^{st}$ device 110, the user must perform a user authentication process with respect to the CPNS server 300 via the $1^{st}$ device 110. However, the user authentication process can be performed differently according to whether the $1^{st}$ device 110 includes a user interface (UI) that can be used in the authentication process.

Hereinafter, a user key installation and authentication process on the basis of a presence/absence of a UI will be described according to an embodiment of the present invention.

Figure 5:
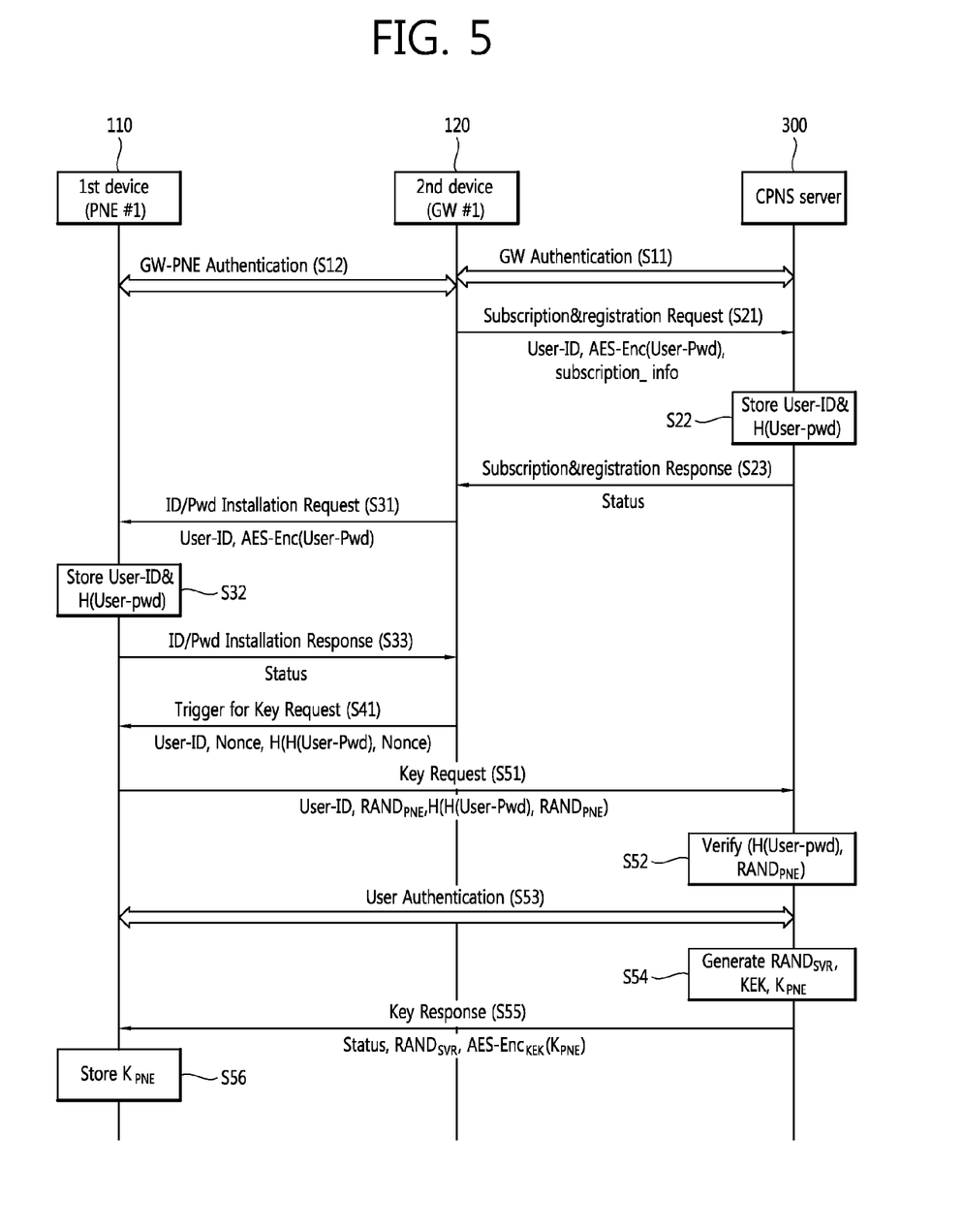
FIG. 5 shows a process of assigning a user key to a device not having a user interface (hereinafter, UI).

FIG. 5 shows a process of assigning a user key to a device not having a user interface (hereinafter, UI). A user key assignment process for the device not having the UI is described with reference to FIG. 5.

It is assumed in FIG. 5 that the $1^{st}$ device 110 operates as a PNE not having a UI function, a network between the $2^{nd}$ device 120 operating as a PN gateway and the $1^{st}$ device 110 is a PAN capable of ensuring confidentiality, and the $1^{st}$ device 110 and the $2^{nd}$ device 120 are owned by the same CPNS user.

Since the $1^{st}$ device 110 does not have the UI function, it cannot directly receive user information for authentication from a user. Therefore, the $1^{st}$ device 110 installs user information via the $2^{nd}$ device 120 having the UI function and thus capable of receiving an input of information from the user, requests the CPNS server 300 to assign a user key by using the installed user information.

First, before performing a user key assignment process, the CPNS server 300 and the $2^{nd}$ device 120 operating as a CPNS gateway perform a mutual authentication and key exchange process (step S11). The mutual authentication between the CPNS server 300 and the $2^{nd}$ device 120 can be achieved by using any one of well-known methods such as a USIM-credential based method, a 3GPP GBA method, etc.

A process of registering the user ID and the user password can be achieved using CPNS interfaces between the $2^{nd}$ device 120 and the CPNS server 300. In addition, the process of registering the user ID and the user password can be achieved by using a channel other than CPNS interfaces between the $2^{nd}$ device 120 and the CPNS server 300 (e.g., a web interface provided by the CPNS server).

The $2^{nd}$ device 120 can transmit the registration request message at the request of the user. For this, the $2^{nd}$ device 120 can receive the user ID, the user password, and subscription information before transmitting the registration request message, and can generate the registration request message such that the received user ID, user password, and subscription information are included therein.

Meanwhile, the registration request message may be an ID_PWD_Registration Request message. The ID_PW-D_Registration Request may include information having the following format.

TABLE 1

| Element | Cardinality | T | Data Type | Description |
| --- | --- | --- | --- | --- |
| ID_PWD_Registration_Request | 1 | E | | Its sub elements are:<br>UserID<br>Password<br>UserDescription |
| UserID | 1 | E | String | UserID that CPNS User wants to use. This element is empty (i.e., <UserID/>), if CPNS User requests CPNS Server to create UserID. |
| Password | 1 | E | String | Password that CPNS User wants to use. This element is empty (i.e., <Password/>), if CPNS User requests CPNS Server to create password. |
| UserDescription | 0 . . . 1 | E | String | User information such as name and subscription number. This element may be filled according to the Operator Policy. |

In addition, before performing the user key assignment process, the $2^{nd}$ device 120 and the $1^{st}$ device 110 perform the mutual authentication and key exchange process (step S12). The authentication process between the $2^{nd}$ device 120 and the $1^{st}$ device 110 can be achieved by using a method proposed in IEEE 802.11, 802.15.1-4 as authentication based on a PAN technique.

The two steps of authentication processes, i.e., S11 and S12, are irrelevant to the order of performing the steps, and are for establishing a communication channel ensuring confidentiality before performing the user key assignment process.

Through the mutual authentication processes, an independent secure communication channel is established between the $1^{st}$ device 110 and the $2^{nd}$ device 120 and between the $2^{nd}$ device 120 and the CPNS server 300. Thereafter, before a user key is assigned to the $1^{st}$ device 110, a user of the $1^{st}$ and $2^{nd}$ devices 110 and 120 registers user information including a user ID and a user password to the CPNS server 300.

For this, the $2^{nd}$ device 120 transmits a registration request message to the CPNS server 300 (step S21). The registration request message may include a user ID (i.e., User-ID), an encrypted user password (i.e., User-Pwd), and subscription information.

Thereafter, upon receiving the registration request message, the CPNS server 300 stores the user ID and user password included in the registration request message (step S22). The process in which the CPNS server 300 stores the user ID and the user password is a registration process for the user. The CPNS server 300 may store a hash value of the user password (that can be expressed, for example, as H(User-Pwd)) instead of storing the user password in a plain text. The user ID and the user password can be stored in a secure storage of the CPNS server 300. The secure storage is a storage area configured to protect stored data from an unauthorized access.

Thereafter, the CPNS server 300 transmits a registration response message to the $2^{nd}$ device 120 (step S23). The registration response message may include handling status information of the registration request message. The handling status information of the registration request message may be information indicating a success or a failure.

Meanwhile, the registration response message may be an ID_PWD_Registration Response message. The ID_PW-D_Registration Response message may include information having the following format.

TABLE 2

| Element | Cardinality | T | Data Type | Description |
|---|---|---|---|---|
| ID_PWD_ Registration Response | 1 | E | | Its attribute is:<br>Status<br>Its sub elements are:<br>UserID<br>Password |
| Status | 1 | A | Integer | The status of success or fail.<br>1 - Success<br>2 - Fail, UserID CPNS User requests to use is already used<br>3 - Fail, UserID CPNS User requests to use is against the policy for UserID (e.g., UserID is too long)<br>4 - Fail, Password CPNS User requests to use is against the policy for password (e.g., password is too short)<br>5 - Fail, failed due to unknown reason. |
| UserID | 0...1 | E | String | UserID that is registered with CPNS Server. In case of registration failure, this element is empty. |
| Password | 0...1 | E | String | Password that is registered with CPNS Server. In case of registration failure, this element is empty. |

After finishing the user registration process with respect to the CPNS server 300, the $2^{nd}$ device 120 performs a process of installing user information to the $1^{st}$ device 110 so that the user can use contents or the like provided from the CPNS server 300. The $2^{nd}$ device 120 performs a process of installing the user information by using an authorized channel established between the $1^{st}$ device 110 and the $2^{nd}$ device 120.

To install the user information, the $2^{nd}$ device 120 may transmit a user information installation request message to the $1^{st}$ device 112 (step S31). The user information installation request message may be configured to include a user ID (i.e., User-ID) and an encrypted user password (i.e., User-Pwd).

To reliably transmit the user password, the $2^{nd}$ device 120 can protect the user password by using a temporary key (TK) between the $1^{st}$ device 110 and the $2^{nd}$ device 120.

Before transmitting the user information installation request message, the $2^{nd}$ device can receive a user ID, a user password, and subscription information from the user, and can generate the user information installation request message such that the user ID, the user password, and the subscription information are included therein.

Meanwhile, the user information installation request message may be an ID_PWD_Request message. The ID_PWD_Request message may include information having the following format.

Next, upon receiving the user information installation request message, the $1^{st}$ device 110 stores the user ID and the user password (step S32). The user password may be stored in the format of a hash value of the user password instead of being stored in the format of a plain text. The user ID and the user password can be stored in a secure storage of the $1^{st}$ device 110. The secure storage is a storage area configured to protect stored data from an unauthorized access.

Next, the $1^{st}$ device 110 transmits the user information installation response message to the $2^{nd}$ device 120 (step S33). The user information installation response message may include a handling result of the user information installation request message.

Meanwhile, the user information installation response message may be a Subscription_Registration_Response message. The Subscription_Registration_Response message may include information having the following format.

TABLE 3

| Element | Cardinality | T | Data Type | Description |
|---|---|---|---|---|
| ID_PWD_ Request | 1 | E | | Its sub elements are:<br>UserID<br>Password |
| UserID | 1 | E | String | UserID that was already registered in the CPNS Server through the Id & Password Registration. This element contains same User ID and to be installed to PNE. |
| Password | 1 | E | String | Password that was already registered in the CPNS Server through the ID & Password Registration. This element contains same Password and to be installed to PNE. |

TABLE 4

| Element | Cardinality | T | Data Type | Description |
|---|---|---|---|---|
| Subscription_ Registration_ | 1 | E | | Its attributes are:<br>Status |

TABLE 4-continued

| Element | Cardinality | T | Data Type | Description |
|---|---|---|---|---|
| Response Status | 1 | A | Integer | The status of success or fail.<br>1 - Success<br>2 - Fail, ID & Password Installation is failed. |

Next, the $2^{nd}$ device 120 transmits a key request trigger message to the $1^{st}$ device 110 (step S41). The trigger message may include a user ID, $RAND_{PNGW}$ which is a nonce generated by the $2^{nd}$ device 120, and a hash value of authentication information using the $RAND_{PNGW}$. The authentication information is for allowing the $1^{st}$ device 110 to confirm whether a user of the $2^{nd}$ device 120 which transmits the trigger message is identical to a user of user information installed in the device 110.

The authentication information AuthData can be configured to include a hash value of a user password. For example, the authentication information can be expressed in the format of AuthData=H (User-Pwd)|$RAND_{PNGW}$|Time. In addition, for example, the hash value of the authentication information using the $RAND_{PNGW}$ can be expressed in the format of H(AuthData, $RAND_{PNGW}$).

For this, the $2^{nd}$ device can receive the user ID (i.e., User-ID) and the user password (i.e., User-Pwd) from the user before transmitting the key request trigger message, generate a nonce that can be expressed such as the $RAND_{PNGW}$, calculate the authentication information by using the nonce, and generate the key request trigger message.

Meanwhile, the key request trigger message may be an EUKeyAssignmentTrigger message. The EUKeyAssignmentTrigger message may include information having the following format.

TABLE 5

| Element | Cardinality | T | Data Type | Description |
|---|---|---|---|---|
| EUKey-Assignment-Trigger | 1 | E | | Its attributes are:<br>UserID<br>Its sub-elements are:<br>TrgInfo |
| UserID | 1 | A | String | UserID of CPNS User who owns both PN GW and PNE |
| TrgInfo | 1 | E | | EUKey Assignment Trigger information<br>Its sub attributes are<br>$RAND_{PNGW}$<br>Time<br>AuthInfo |
| $RAND_{PNGW}$ | 1 | A | Integer | $RAND_{PNGW}$ is a random number generated by the PN GW |
| Time | 1 | A | String | Time is me current time as measured by the PN GW |
| AuthInfo | 1 | A | String | AuthInfo is a Hash (AuthData) where AuthData = Hash(Password) | Nonce | Time |

Next, upon receiving the key request trigger message, the $1^{st}$ device 110 determines whether the trigger message is requested by a user of the $1^{st}$ device 110 on the basis of authentication information and $RAND_{PNGW}$ included in the received key request trigger message. That is, the $1^{st}$ device 110 determines whether the trigger is transmitted by the user of the $1^{st}$ device 110 by confirming whether a user password included in the authentication information is identical to a user password installed in the $1^{st}$ device 110. Whether the passwords are identical to each other can be determined according to whether the passwords have the same hash value.

Next, if it is determined that the trigger message is transmitted by the user of the $1^{st}$ device 110, the $1^{st}$ device 110 transmits a user key assignment request message to the CPNS server 300 (step S51). Since the $1^{st}$ device 110 is not directly connected to the CPNS server 300, the $2^{nd}$ device 120 relays the user key assignment request message between the $1^{st}$ device 110 and the CPNS server 300.

The user key assignment request message can be configured to include the user ID (i.e., User-ID), a random number $RAND_{PNE}$ generated by the $1^{st}$ device 110 and a hash value of authentication information using the $RAND_{PNE}$. The authentication information using the $RAND_{PNE}$ is for allowing the CPNS server 300 to confirm whether a user transmitting the user key assignment request message is identical to a user registered to the CPNS server 300.

The authentication information AuthData using the $RAND_{PNE}$ can be configured to include the hash value of the user password. For example, the authentication information can be expressed in the format of AuthData=H (User-Pwd)|$RAND_{PNE}$|Time. In addition, for example, the hash value of the authentication information using the $RAND_{PNE}$ can be expressed in the format of H(AuthData, $RAND_{PNE}$). Since the hash value of the authentication information is included in the key assignment request message, the user password included in the authentication information is transmitted to the CPNS server 300 without being exposed as a plain text.

Meanwhile, the user key assignment request message may be an EUKeyAssignmentRequest message. The EUKeyAssignmentRequest message may include information having the following format.

TABLE 6

| Element | Cardinality | T | Data Type | Description |
|---|---|---|---|---|
| EUKey-Assigmnent-Request | 1 | E | | Its attributes are:<br>UserID<br>EntityID<br>Its sub-element is:<br>ReqInfo |
| UserID | 1 | A | String | UserID of CPNS User who owns an assignee PNE/PN GW |
| EntityID | 1 | A | String | EntityID of an assignee PNE/PN GW |
| ReqInfo | 1 | E | | EUKeyAssignmentRequest information<br>Its sub attributes are<br>$RAND_{Assignee}$<br>Time<br>AuthInfo |
| RANDAssignee | 1 | A | Integer | $RAND_{Assignee}$ is a random number generated by the assignee CPNS Entity (i.e., PNE or PN GW) |
| Time | 1 | A | String | Time is the current time measured by the assignee CPNS Entity (i.e., PNE or PN GW) |
| AuthInfo | 1 | A | String | AuthInfo is a Hash (AuthData) where AuthData = Hash(Password) | $RAND_{Assignee}$ | Time |

Next, the CPNS server 300 which receives the user key assignment request message verifies whether the user key assignment request message is requested by a user registered to the CPNS server on the basis of authentication information and $RAND_{PNE}$ included in the received user key assignment message (step S52). That is, the CPNS server 300 determines whether a user password included in the authentication information is identical to a user password stored in the CPNS server 300, and thus determines whether the user key assignment request message is transmitted by the user registered to the CPNS server 300. Whether the passwords are identical to each other can be determined according to whether the passwords have the same hash value.

Next, if an additional authentication process is necessary between the 1$^{st}$ device 110 and the CPNS server 300, an additional authentication process can be performed (step S53). However, if user authentication is sufficiently achieved by using the user key assignment request message, the additional authentication process (step S53) can be skipped.

Next, if the CPNS server 300 confirms that the user key assignment request message is transmitted by the user registered to the CPNS server 300, the CPNS server 300 generates a random number $RAND_{SRV}$, generates a user key or a EUKey (i.e., $K_{PNE}$) for the user of the 1$^{st}$ device, and generates a key encryption key (KEK) for reliably transmitting the user key (i.e., $K_{PNE}$) (step S54).

The user key $K_{PNE}$ can be generated in a random number format. The KEK can be generated according to a key derivation method on the basis of the $RAND_{SRV}$, the $RAND_{PNE}$, and a hash value of the user password. For example, the KEK can be generated according to the derivation method such as $KEK=H(H(User-Pwd)|RAND_{PNE}|RAND_{SRV})$.

Next, the CPNS server 300 transmits the user key assignment response message to the 1$^{st}$ device 110 (step S55). Since the 1$^{st}$ device 110 is not directly connected to the CPNS server 300, the 2$^{nd}$ device 120 relays the user key assignment response message between the 1$^{st}$ device 110 and the CPNS server 300.

The user key assignment response message may include handling state information of the user key assignment request message, a random number $RAND_{SRV}$ generated by the CPNS server 300, and the user key $K_{PNE}$ encrypted by using the encryption key KEK.

Meanwhile, the user key assignment response message may be an EUKeyAssignmentResponse message. The EUKeyAssignmentResponse message may include information having the following format.

TABLE 7

| Element | Cardinality | T | Data Type | Description |
|---|---|---|---|---|
| EUKey-Assignment-Response | 1 | E | | Its attributes are:<br>Result<br>UserID<br>EntityID |
| Result | 1 | A | Integer | The Result of success or fail.<br>1 - Success<br>2 - Fail, User authentication fails<br>3 - Fail, Other reasons |
| UserID | 1 | A | String | UserID of CPNS User who owns an assignee PNE/PN GW |
| EntityID | 1 | A | String | EntityID of an assignee PNE/PN GW |
| ResInfo | 1 | E | | EUKeyAssignmentResponse information<br>Its sub attributes are<br>$RAND_{SVR}$<br>EUKey<br>Temporary Key |
| $RAND_{SVR}$ | 1 | A | Integer | $RAND_{SVR}$ is a random number generated by the CPNS Server |
| EUKey | 1 . . . n | A | String | Encrypted EUKey that is encrypted by the KEK |
| TemporaryKey | 0 . . . 1 | A | String | Key used for ensuring the security between PNE and PN GW in the case of underlying network does not support sufficient security mechanism. |

Next, upon receiving the user key assignment response message, the 1st device 110 decodes the user key (i.e., $K_{PNE}$) from the encrypted user key included in the received user key assignment response message, and stores the decoded user key (i.e., $K_{PNE}$) in a secure storage (step S56). The 1st device 110 can derive a KEK on the basis of the $RAND_{SRV}$, the $RAND_{PNE}$, and a hash value of the user password according to the same method as the KEK derivation method from the perspective of the CPNS server 300, and can decode the user key (i.e., $K_{PNE}$) by the derived KEK.

In the above description, the 1st device 110 obtains the user key (i.e., $K_{PNE}$) generated from the CPNS server 300 through the aforementioned user key assignment process and assigned to the 1st device 100. The 1st device 110 can receive contents or the like provided from the CPNS server 300 via the 2nd device 120 operating as a CPNS gateway, as shown in FIG. 2, by using the obtained key (i.e., $K_{PNE}$).

Figure 6:
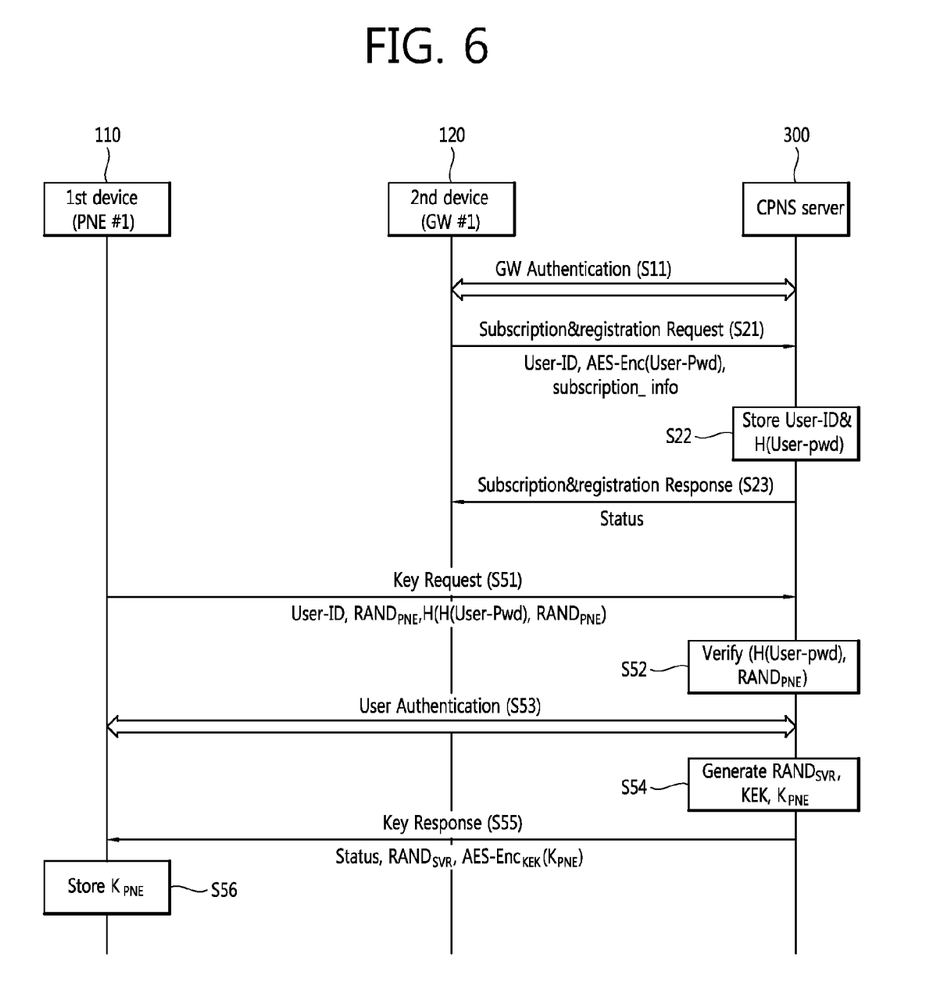
FIG. 6 shows a process of assigning a user key to a device having a user interface (UI).

FIG. 6 shows a process of assigning a user key to a device having a user interface (UI). A user key assignment process for a device having a UI is described with reference to FIG. 6.

Unlike FIG. 5, the 1st device 110 has a UI function, and thus can directly receive an input of user information for authentication from the user. Therefore, to assign a CPNS user key, the 1st device 110 directly receives an input of the user information from the user, and requests the CPNS server 300 to assign the user key by using the input user information.

First, the 2nd device 120 operating as a CPNS gateway performs a mutual authentication and key exchange process with respect to the CPNS server 300 before performing a user key assignment process (step S11). The mutual authentication between the CPNS server 300 and the 2nd device 120 can be achieved by using any one of well-known methods such as a USIM-credential based method, a 3GPP GBA method, etc.

Through the mutual authentication processes, an independent secure communication channel is established between the 2nd device 120 and the CPNS server 300. Thereafter, before a user key is assigned to the 1st device 110, a user of the 1st and 2nd devices 110 and 120 registers user information including a user ID and a user password to the CPNS server 300. Since this is the same as the user registration process (steps S21 to S23) described with reference to FIG. 5, descriptions thereof will be omitted.

Thereafter, the 1st device 110 having the UI function can perform a process of requesting assignment of a user key without a process of installing user information or receiving a trigger message for a user key assignment request. Therefore, in the user key assignment process of the 1st device 100 having the UI function, the user information installation process (steps S31 to S33) of FIG. 5 and a process of receiving a trigger message (step S41) are omitted.

Next, the 1st device 110 transmits a user key assignment request message to the CPNS server 300 (step S51). Since the 1st device 110 is not directly connected to the CPNS server 300, the 2nd device 120 relays the user key assignment request message between the 1st device 110 and the CPNS server 300.

The user key assignment request message can be configured to include the user ID (i.e., User-ID), a random number $RAND_{PNE}$ generated by the 1st device 110 and a hash value of authentication information using the $RAND_{PNE}$.

For this, the 1st device 110 can receive a user ID (i.e., User-ID) and a user password (i.e., User-Pwd) from the user before transmitting the user key assignment request message, can generate the $RAND_{PNE}$, and can calculate a hash value of the authentication information.

The authentication information AuthData using the $RAND_{PNE}$ can be configured to include the hash value of the user password. For example, the authentication information can be expressed in the format of AuthData=H (User-Pwd) |$RAND_{PNE}$|Time. In addition, for example, the hash value of the authentication information using the $RAND_{PNE}$ can be expressed in the format of H(AuthData, $RAND_{PNE}$). Since the hash value of the authentication information is included in the key assignment request message, the user password included in the authentication information is transmitted to the CPNS server 300 without being exposed as a plain text.

Next, the CPNS server 300 which receives the user key assignment request message verifies whether the user key assignment request message is requested by a user registered to the CPNS server on the basis of authentication information and $RAND_{PNE}$ included in the received user key assignment message (step S52). That is, the CPNS server 300 determines whether a user password included in the authentication information is identical to a user password stored in the CPNS server 300, and thus determines whether the user key assignment request message is transmitted by the user registered to the CPNS server 300. Whether the passwords are identical to each other can be determined according to whether the passwords have the same hash value.

Next, if an additional authentication process is necessary between the 1st device 110 and the CPNS server 300, an additional authentication process can be performed (step S53). However, if user authentication is sufficiently achieved by using the user key assignment request message, the additional authentication process (step S53) can be skipped.

Next, if the CPNS server 300 confirms that the user key assignment request message is transmitted by the user registered to the CPNS server 300, the CPNS server 300 generates a random number $RAND_{SRV}$, generates a user key or a EUKey (i.e., $K_{PNE}$) for the user of the 1st device, and generates a key encryption key (KEK) for reliably transmitting the user key (i.e., $K_{PNE}$) (step S54).

The user key $K_{PNE}$ can be generated in a random number format. The KEK can be generated according to a key derivation method on the basis of the $RAND_{SRV}$, the $RAND_{PNE}$, and a hash value of the user password. For example, the KEK can be generated according to the derivation method such as KEK=H(H(User-Pwd)|$RAND_{PNE}$|$RAND_{SRV}$).

Next, the CPNS server 300 transmits the user key assignment response message to the 1st device 110 (step S55). Since the 1st device 110 is not directly connected to the CPNS server 300, the 2nd device 120 relays the user key assignment response message between the 1st device 110 and the CPNS server 300.

The user key assignment response message may include handling state information of the user key assignment request message, a random number $RAND_{SRV}$ generated by the CPNS server 300, and the user key $K_{PNE}$ encrypted by using the encryption key KEK.

Next, upon receiving the user key assignment response message, the 1st device 110 decodes the user key (i.e., $K_{PNE}$) from the encrypted user key included in the received user key assignment response message, and stores the decoded user key (i.e., $K_{PNE}$) in a secure storage (step S56). The 1st device 110 can derive a KEK on the basis of the $RAND_{SRV}$, the $RAND_{PNE}$, and a hash value of the user password according to the same method as the KEK derivation method from the perspective of the CPNS server 300, and can decode the user key (i.e., $K_{PNE}$) by the derived KEK.

In the above description, the 1st device 110 obtains the user key (i.e., $K_{PNE}$) generated from the CPNS server 300 through the aforementioned user key assignment process and assigned to the 1st device 100. The 1st device 110 can receive contents or the like provided from the CPNS server 300 via the $2^{nd}$ device 120 operating as a CPNS gateway, as shown in FIG. 2, by using the obtained key (i.e., $K_{PNE}$).

Figure 7:
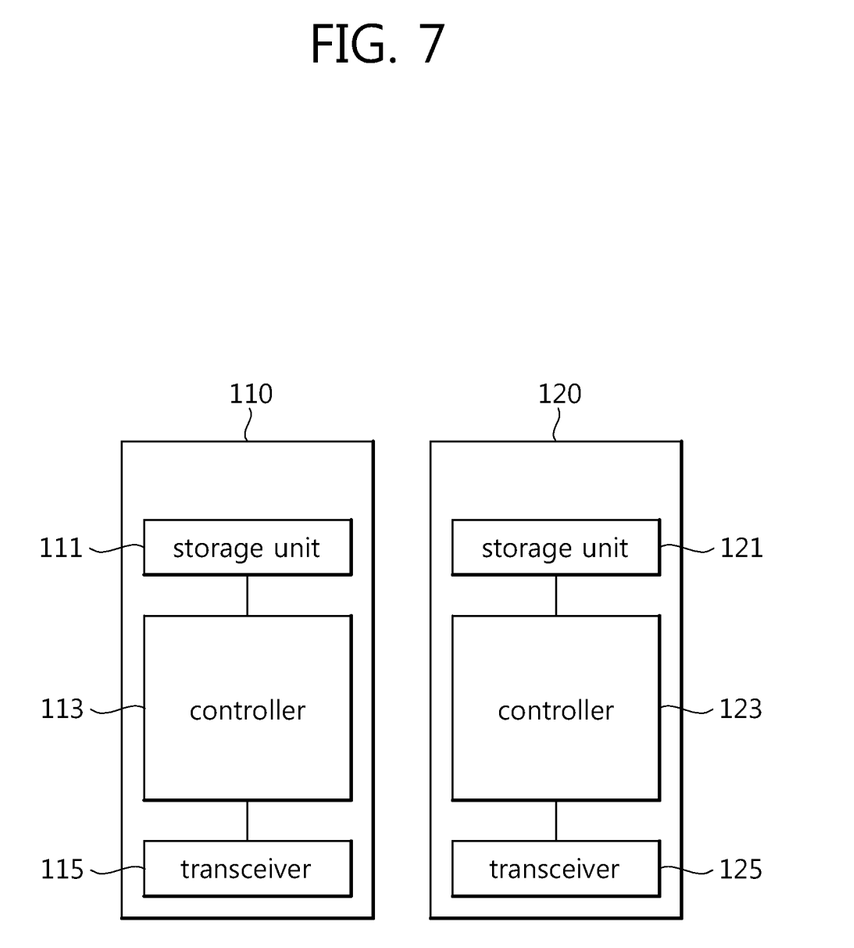
FIG. 7 is a block diagram of CPNS devices according to an embodiment of the present invention.

FIG. 7 is a block diagram of CPNS devices according to an embodiment of the present invention.

Referring to FIG. 7, a $1^{st}$ device 110 operating in a CPNS PNE mode includes a storage unit 111, a controller 113, and a transceiver 115, and a $2^{nd}$ device 120 operating in a CPNS gateway mode includes a storage unit 121, a controller 123, and a transceiver 125.

The storage unit 111 and the storage unit 121 store each of the methods of FIG. 2 to FIG. 6. The controller 113 controls the storage unit 111 and the transceiver 115 by executing the methods stored in the storage unit 111. The controller 123 controls the storage unit 121 and the transceiver 125 by executing the methods stored in the storage unit 121.

For example, the storage unit 121 may store a CPNS enabled entity configured to a PNE mode. Further, under the control of the controller 123, the transceiver 125 may transmit an installation request message including user information to a $1^{st}$ device having a CPNS enabled entity configured to a PNE mode, receive an installation response message from the $1^{st}$ device in response to the installation request message, transmit a trigger message including $1^{st}$ authentication data to the $1^{st}$ device, receive a key assignment request message generated on the basis of the $1^{st}$ authentication data from the $1^{st}$ device, relay the received key assignment request message to a server, receive a key assignment response message including a user key for the $1^{st}$ device from the server in response to the key assignment request message, and relay the received key assignment response message to the $1^{st}$ device. Furthermore, the controller 123 may generate the $1^{st}$ authentication data on the basis of authentication information received by a user input so that the $1^{st}$ device can request the assignment of the user key.

The following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparently understandable that an embodiment is configured by combining claims failing to have relation of explicit citation in the appended claims together or can be included as new claims by amendment after filing an application.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all changes which come within the equivalent scope of the invention are included in the scope of the invention. An embodiment can be configured by combining claims failing to have relation of explicit citation in the appended claims together or can be included as new claims by amendment after filing an application.

What is claimed is:

1. A method of operating a converged personal network service (CPNS) gateway apparatus for assigning a CPNS user key to a terminal, the method comprising:

transmitting a registration request message including user information to a server;

transmitting an installation request message including the user information to the terminal;

generating a trigger message including first authentication data;

transmitting the trigger message including the first authentication data to the terminal;

receiving a key assignment request message including second authentication data from the terminal in response to the trigger message, wherein the key assignment request message is received according to an evaluation result of the trigger message including the first authentication data, and the second authentication data is generated on the basis of the user information;

transmitting the received key assignment request message to the server;

receiving a key assignment response message including a user key for the terminal from the server in response to the key assignment request message, wherein the key assignment response message is received according to an evaluation result of the second authentication data using the user information in the server; and transmitting the received key assignment response message to the terminal.

2. The method of claim 1, wherein the first authentication data is for confirming whether the trigger message is transmitted by a user of the terminal.

3. The method of claim 2, wherein the first authentication data is for examining whether authentication information is matched to the user information.

4. The method of claim 3, wherein the terminal does not have a user interface (UI) function capable of receiving an input from the user to request an assignment of the user key.

5. The method of claim 4, wherein the first authentication data is for performing processes of requesting the assignment of the user key for the terminal not having the UI function.

6. The method of claim 3, wherein the user information and the authentication information include a user identifier (ID) and a user password.

7. The method of claim 1, wherein the second authentication data is for confirming whether the key assignment request message is transmitted by a user of the terminal.

8. The method of claim 7, wherein the second authentication data is for examining whether user information installed to the terminal is matched to user information registered to the server.

9. The method of claim 1, wherein the terminal and the CPNS gateway apparatus are mutually authenticated from each other.

10. The method of claim 1, wherein the CPNS gateway apparatus and the server are mutually authenticated from each other.

11. A method of operating a converged personal network service (CPNS) terminal which requests the assignment of a CPNS user key, the method comprising:

receiving an installation request message including user information from a gateway apparatus;

installing the user information;

transmitting an installation response message to the gateway apparatus in response to the installation request message;

receiving a trigger message including first authentication data from the gateway apparatus;

evaluating whether the trigger message is transmitted by a user of the CPNS terminal;

if the evaluation result shows that the trigger message is transmitted by the user of the CPNS terminal, transmitting a key assignment request message including second authentication data to the gateway apparatus so that the CPNS server can assign a user key; and receiving a key assignment response message including the assigned user key.

12. A communication apparatus comprising:

a storage unit configured to store a converged personal network service (CPNS) enabled entity configured to a personal network gateway (PNE) mode;

a transceiver for transmitting an installation request message including user information to a terminal having a CPNS enabled entity configured to a PNE mode, for receiving an installation response message from the terminal in response to the installation request message, for transmitting a trigger message including first authentication data to the terminal, receive a key assignment request message, for relaying the received key assignment request message to a server, for receiving a key assignment response message including a user key for the terminal from the server in response to the key assignment request message, and for relaying the received key assignment response message to the terminal; and a controller for generating the trigger messaged including the first authentication data so that the terminal can request the assignment of the user key.

* * * * *